United States Patent [19]
Robota et al.

[11] 3,872,175
[45] Mar. 18, 1975

[54] CATALYTIC PROCESS FOR PREPARING ALKYL CHLORIDES

[75] Inventors: Stephen Robota, N. Tonawanda; Francis P. Mershon, White Plains, both of N.Y.

[73] Assignee: Hooker Chemical Corporation, Niagara Falls, N.Y.

[22] Filed: Aug. 31, 1973

[21] Appl. No.: 393,550

[52] U.S. Cl.................................. 260/657, 252/449
[51] Int. Cl.............................................. C07c 17/16
[58] Field of Search................................... 260/657

[56] References Cited
FOREIGN PATENTS OR APPLICATIONS
1,543,063   8/1970   Germany........................... 260/657

*Primary Examiner*—Daniel D. Horwitz
*Attorney, Agent, or Firm*—Peter F. Casella; Donald C. Studley

[57] ABSTRACT

Alkyl chlorides are produced by the reaction of hydrogen chloride with the corresponding alkanol in the presence of a catalyst of calcined attapulgus clay (fullers earth).

2 Claims, No Drawings

CATALYTIC PROCESS FOR PREPARING ALKYL CHLORIDES

The present invention relates to the use of a calcined clay as a catalyst in a vapor-phase catalytic process for the manufacture of alkyl chlorides.

It is known that alkyl chlorides may be prepared by the reaction of hydrogen chloride with the corresponding alkanol in the vapor phase in the presence of a catalyst. These processes give a good yield over short periods of time but because of the physical loss of catalyst and the loss of activity of the catalyst, the commercial aspects of such a process are negatively affected. Many of the presently used catalysts are themselves costly, and their physical loss, or the expense of operation of auxiliary recovery processes, and the need for frequent reactivation are adverse factors.

It has now been found that calcined attapulgus clay catalizes this reaction. The efficiency of a clay catalyst is comparable to the prior art catalysts and the cost substantially less.

According to the present invention there is provided a process for the manufacture of alkyl chlorides which comprises reacting hydrogen chloride with the corresponding alkanol in the vapor phase at an elevated temperature in the presence of a calcined attapulgus clay catalyst.

The present catalyst may be used in either a fixed or fluidized bed.

The proportions of the reactants, hydrogen chloride and the alkanol may be varied over rather wide ranges, but it is preferred to maintain a slight molar excess of hydrogen chloride, e.g., 1.05 to 1.15 moles of hydrogen chloride per mole of alkanol.

The reaction temperature is preferably maintained in the range of 250°C to 400°C. The range 250°C to 325°C is preferred and also has an advantage with the present catalyst that a relatively high degree of conversion of the alkanol may be obtained under these relatively mild conditions.

The reaction is conveniently carried out at substantially atmospheric pressure, but higher or lower pressures may be used.

The present process is applicable in particular to the manufacture of methyl chloride from methanol and hydrogen chloride, but is also applicable to the preparation of other alkyl chlorides (e.g. those containing from two to four carbon atoms) from the corresponding alkanol.

The clay catalysts suited to use in the present invention are those naturally occurring clays generically known as attapulgus clay or fullers earth. Such clays are found in the States of Georgia and Florida. These clays are not pure compounds but are generally assigned the chemical formula of $(OH_2)_4(OH)_2Mg_5Si_8O_{20}\cdot 4H_2O$. They have a specific gravity of from 2.2 to 2.4 and tested in distilled water they have a pH of from 7.3 to 8.2. In preparing the clay for use in the present invention it is calcined at a temperature of 700° to 1,200°F. The volatility loss is in the range of 4–6 percent. The calcined product is particulate. The natural clay may initially be extruded at high pressure and then calcined to yield a preferred form of catalyst.

The invention is illustrated, but not limited, by the following examples.

EXAMPLE I

Attapulgus clay was calcined at over 700°F to give the following typical analysis:

| | |
|---|---|
| $SiO_2$ (as silica) | 8.61% |
| $SiO_2$ (hydrated) | 1.74% |
| $SiO_2$ (combined with bases) | 46.52% |
| $Al_2O_3$ | 12.01 |
| MgO | 7.12 |
| $Fe_2O_3$ | 3.21 |
| FeO | 0.22 |
| $TiO_2$ | 0.99 |
| $MnO_2$ | 0.08 |
| CaO | 1.18 |
| $Na_2O$ | 0.11 |
| $K_2O$ | 0.51 |
| $P_2O_5$ | 0.55 |
| Ignition Loss | 17.30 |
| TOTAL | 100.15 |

EXAMPLE 2

A mixture of methanol and hydrogen chloride was preheated to 200°C, the mixture vaporized and fed through a 6 inch bed of calcined attapulgus clay in a 2 inch diameter, 44 inch long tubular nickel reactor. The reactor was heated to a temperature of 319°C by utilizing Nichrome wire wound around the outside of the reactor. HCl was fed into the reactor at a rate of 0.23 pounds per hour. $CH_3OH$ was fed into the reactor at a rate of 0.22 pounds per hour. The effluent from the reactor was cooled and $H_2O$, $CH_3OH$ and HCl were removed from the effluent gas. The remaining gas, substantially entirely $CH_3Cl$, was collected as a liquid in cold traps. Conversions and yields were calculated from the amount of $H_2O$, HCl, $CH_3OH$ and $CH_3Cl$ collected and by a gas chromatographic analysis. The $CH_3Cl$ yield based upon $CH_3OH$ was found to be 0.973. The total conversion, pounds $CH_3OH$ to total pounds of feed, was 0.983.

EXAMPLE 3

The process of Example 2 was repeated at a reactor temperature of 290°C. The yield was found to be 0.929. The total conversion was found to be 0.941.

What is claimed is:

1. A process for the production of alkyl chlorides of from 1 to 4 carbon atoms by the vapor phase reaction of hydrogen chloride with the corresponding alkanol at a temperature between about 250° and about 400°C in the presence of a calcined attapulgus clay catalyst.

2. The process of claim 1 wherein the alkanol is methanol.

* * * * *